W. W. NUGENT.
GRAVITY CENTER OILER.
APPLICATION FILED OCT. 2, 1905.
905,914.
Patented Dec. 8, 1908.
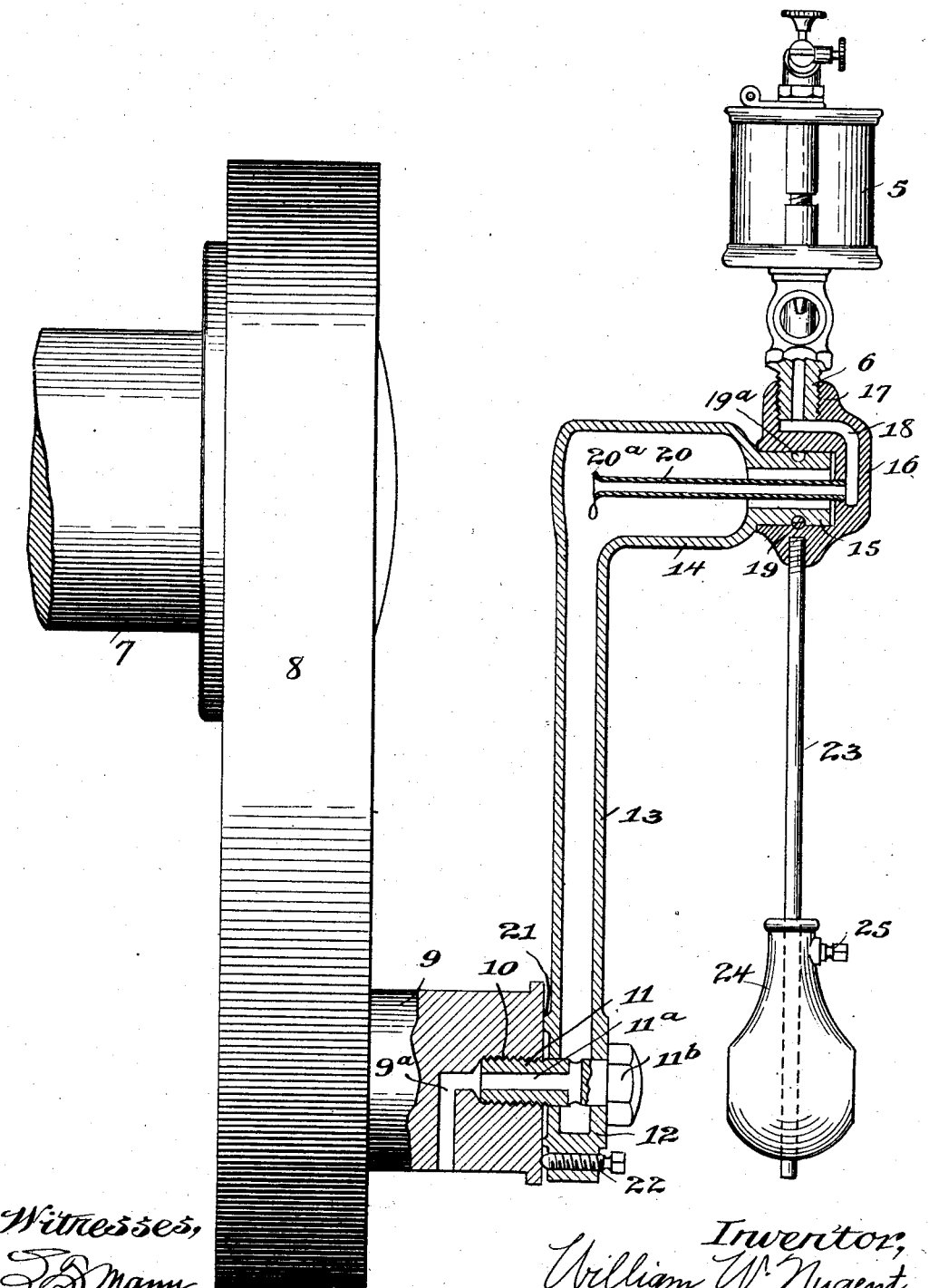
Witnesses,
T. S. Mann
S. N. Pond
Inventor,
William W. Nugent,
By Offield, Towle & Linthicum
Attys.

UNITED STATES PATENT OFFICE.

WILLIAM W. NUGENT, OF CHICAGO, ILLINOIS.

GRAVITY-CENTER OILER.

No. 905,914.  Specification of Letters Patent.  Patented Dec. 8, 1908.

Application filed October 2, 1905. Serial No. 281,065.

*To all whom it may concern:*

Be it known that I, WILLIAM W. NUGENT, a citizen of the United States, residing at Chicago, in the county of Cook and State of Illinois, have invented certain new and useful Improvements in Gravity Center Oilers, of which the following is a specification.

My invention relates to that class of lubricators in which the oil receptacle is supported upright upon a bearing concentric with the axis of rotation or oscillation of the bearing to be lubricated by means of a counter-weight, and in which the lubricant is supplied to the bearing through the end of the journal.

My present invention comprises improvements upon the oiler disclosed in Letters Patent No. 626,291, granted to me June 6, 1899; these improvements relating to a means for preventing oscillation or rocking of the oil receptacle under variations in speed and length of stroke; to an improved oil-cup or funnel holder and means for fastening the same on its bearing; to an improved one-piece connection supporting the oil-cup or funnel holder and constituting the duct for the flow of the oil to the part to be lubricated; to a means whereby the oil is delivered directly from the oil-cup or funnel holder into the bore of the tubular radius arm of said connection; and to an improved connection of the latter to the crank-pin, designed to insure a more perfect joint and to prevent angular displacement of the tubular radius arm in securing the same rigidly in position after it has been set to make the oil holder bearing concentric axially with the engine shaft.

With these improvements in view, my invention consists in the novel features of construction and relative arrangement of parts hereinafter described and more particularly pointed out in the claims.

Referring to the accompanying drawing, which illustrate my present improvements in approved mechanical forms,—the figure is a partial elevation and section of my improved device applied to a crank or wrist-pin bearing, the section being made in a plane cutting the crank-pin and the revolving support of the oil-cup axially.

Referring to the drawing, 5 designates an ordinary sight-feed, or any suitable form of oil-cup, preferably provided with the usual means for regulating the flow of oil therefrom, and with a perforated screw-threaded plug 6 for the attachment of the cup to the journal box or part designed to carry it.

7 represents the engine shaft; 8 a crank mounted thereon, and 9 a crank or wrist-pin, in the outer end of which is formed a threaded socket 10 for the reception and attachment of a tubular screw-threaded stud or bolt 11. An axial passage $11^a$ in stud 11 communicates at its inner end with a passage $9^a$ formed in the crank-pin and leading to its bearing surface, where the oil is to be delivered. The stud 11 is formed at its outer end with a head $11^b$, and upon it, between its head and the end of the crank-pin 9, is fitted and mounted the hub 12 of a one-piece tubular radius arm and oil-cup support, the radius arm being designated by 13 and the oil-cup support, which projects outwardly at right angles from its other end, being designated by 14.

The outer end of the support 14 takes the form of a hollow projecting boss 15, constituting a bearing for the oil-cup holder 16. This latter is a casting having at its upper end an internally threaded seat 17 engaged by the threaded plug 6 of the oil-cup, and a duct 18 cored therein and communicating with the lower end of the seat 17. The oil-cup holder 16 is loosely journaled on the bearing boss 15, being confined thereon against endwise displacement by a cotter-pin 19 passed through the holder casting and engaging a semi-circular groove $19^a$ in the bearing face of the boss.

20 designates a small tube secured to the holder 16 at one end and communicating at said end with the duct 18; said tube extending through the bearing boss 15 and oil-cup support, and terminating at a point in line with the bore of the radius arm 13. The inner end of the tube 20 preferably terminates in an outwardly flaring flange $20^a$.

The inner face of the enlarged end or hub of the radius arm which is connected to the crank-pin 9 is formed with an annular bearing rib 21, the diameter of which is considerably in excess of the diameter of the head $11^b$ of the connecting bolt 11, and the extreme inner end of the radius arm 13 carries a set-screw 22, the inner end of which is adapted to be forced against the face of the crank-pin after the radius arm has been accurately adjusted, so as to lock it in adjusted position.

Screwed into or otherwise secured to the lower side of the oil-cup holder 16 is a rod 23, on which is slidably mounted a bob or counter-weight 24; an important feature of this latter being its capacity for adjustment on the rod 23, as by means of a set-screw 25. I have found in practice that in a gravity center-oiler of this class, the oil-cup should be held substantially stationary or against rocking movement under all working conditions; and I have also ascertained that the behavior of the oil-cup in this respect varies both with the length of the stroke and the speed of rotation, so that, if the counter-weight 24 is adjusted so as to hold the oil-cup stationary under a given length of stroke and a given speed of rotation, if either or both of these factors varies, it is essential to vary the length of the counter-balancing arm of the oil-cup to compensate therefor. This latter, in my present invention, can be easily and quickly effected by loosening the set-screw 25, re-adjusting the weight 24, and again tightening the set-screw. I have also found in practice that the formation of the radius arm, its hub, and the oil-cup support or journal in one piece produces not only a simpler but a more efficient and reliable structure for accurately and rigidly supporting the oil-cup and maintaining the axis of rotation of the oil-cup holder always coincident with the axis of the engine shaft, as compared with the construction of my prior patent, above referred to, wherein said parts are composed of three connected and joined pieces.

The bearing rib 21 on the hub of the radius arm, engaging the end or outer face of the crank-pin also presents an improvement, in that it secures a close frictional engagement between said parts, even though the end or face of the crank-pin be not perfectly flat or level; and inasmuch as the bearing rib has a considerably larger diameter than the head 11ᵇ of the fastening stud, the turning up of the latter will not displace the radius arm from its previously adjusted position by reason of its frictional engagement with the opposite side of the hub.

The duct tube 20 serves to conduct the oil through the journal 15 and support 14, delivering said oil directly into or in line with the bore of the radius arm. The flaring lip or flange 20ᵃ on the delivery end of said tube serves to prevent the oil from creeping backwardly on the outer surface of said tube and escaping through the relatively loose bearing of the holder 16 upon the journal 15.

The simplicity of the several parts enables them to be readily assembled, and also enables the radius arm to be accurately adjusted so as to bring the axis of the journal 15 accurately coincident with the projected axis of the engine shaft. The radius arm having been thus adjusted and secured by turning up the stud 11, it is locked in this position by turning up the set-screw 22, the inner end of which tends to bite into the face of the crank-pin, thus preventing angular displacement of said radius arm.

I claim:

1. In a gravity center oiler, the combination with an oil-cup, or a cored support therefor connected to and communicating with the bearing to be lubricated and having a hollow journal bearing the bore of which is axially coincident with the axis of rotation or oscillation, and an oil-cup holder loosely mounted upon said bearing and having a cored oil-duct extending to a point opposite the outer end of said hollow journal bearing and in constant communication with the interior of said cored support, substantially as described.

2. In a gravity center-oiler, the combination with an oil-cup, of a hollow supporting arm at one end connected to and communicating with the bearing to be lubricated, the opposite end of said arm having a journal bearing axially coincident with the axis of rotation or oscillation, an oil-cup holder loosely mounted upon said bearing having a cored oil-duct leading to a point opposite the end of said journal bearing, and an oil-conducting tube connected to said oil-cup holder in communication with the oil duct thereof and extending through and co-axially with said journal bearing to a point in the path or projection of the bore of said hollow arm substantially as described.

3. In a gravity center-oiler, the combination with an oil-cup, of a hollow supporting arm at one end connected to and communicating with the bearing to be lubricated, the opposite end of said arm having a journal bearing axially coincident with the axis of rotation or oscillation, an oil-cup holder loosely mounted upon said bearing having a cored oil-duct leading to a point opposite the end of said journal bearing, and an oil-conducting tube connected to said oil-cup holder in communication with the oil duct thereof and extending through and co-axially with said journal bearing to a point in the path or projection of the bore of said hollow arm, said oil-conducting tube being outwardly flared at its inner end, substantially as described.

4. In a gravity center-oiler, the combination with an oil-cup, of an integral or one-piece supporting and oil-conducting member made hollow throughout and comprising a hub adapted to be connected to the bearing to be lubricated, a radius arm, and a journal bearing axially coincident with the axis of rotation or oscillation, and an oil-cup holder loosely mounted on said journal bearing, substantially as described.

5. In a gravity center-oiler, the combination with an oil-cup, of a hollow supporting and oil-conducting member comprising a hub, a radius arm, and a journal bearing axially coincident with the axis of rotation or oscillation, said hub having on one face thereof an annular bearing rib, a suitably cored stud adapted to clamp said annular bearing rib against the end face of the crank or wrist-pin to be lubricated, and an oil-cup holder loosely mounted on said journal bearing, substantially as described.

6. In a gravity center-oiler, the combination with a hollow oil-cup supporting member having a journal bearing axially coincident with the axis of rotation or oscillation and connected to and communicating with the member to be lubricated, of an oil-cup holder loosely mounted on said journal bearing and having an oil duct communicating with the interior of said supporting member, an oil-cup mounted on said holder, a counter-weight suspended from said holder, and means for varying the distance of said counter-weight from said holder, substantially as described.

7. In a gravity center-oiler, the combination with a hollow oil-cup supporting member having a journal bearing axially coincident with the axis of rotation or oscillation and connected to and communicating with the member to be lubricated, of an oil-cup holder loosely mounted on said journal bearing and having an oil duct communicating with the interior of said supporting member, an oil-cup mounted on said holder, a rod depending from said holder, and a counter-weight adjustably mounted on said rod, substantially as described.

8. In a gravity center-oiler, the combination with an oil-cup, of a support therefor connected to and communicating with the bearing to be lubricated and having a journal bearing axially coincident with the axis of rotation or oscillation, an oil-cup holder loosely mounted upon said bearing and having an oil-duct communicating with the interior of said support, and means for preventing endwise displacement of said holder upon said bearing comprising a cotter-pin passed through the former and engaging a circumferential groove in the latter, substantially as described.

WILLIAM W. NUGENT.

Witnesses:
SAMUEL N. POND,
FREDERICK C. GOODWIN.